Patented Sept. 25, 1951

2,568,955

UNITED STATES PATENT OFFICE 2,568,955

FLATIRON STAND

Arthur R. Englander, University Heights, Ohio

Application October 14, 1947, Serial No. 779,674

2 Claims. (Cl. 248—117.2)

This invention relates to stands or supports for heated objects, and more particularly to supports for electric flatirons. It has for its general object to provide a support of this kind which is capable of maintaining a flatiron in adequately spaced relation with reference to an ironing board cover, which will not be readily displaced from the said cover, which is light in weight and simple in construction, but which will withstand the heat of the flatiron which is supported thereby and will protect the ironing board cover against overheating, and which, moreover, can be quickly assembled and disassembled, in which latter condition it will occupy a small space for purposes of shipment.

Figure 1:
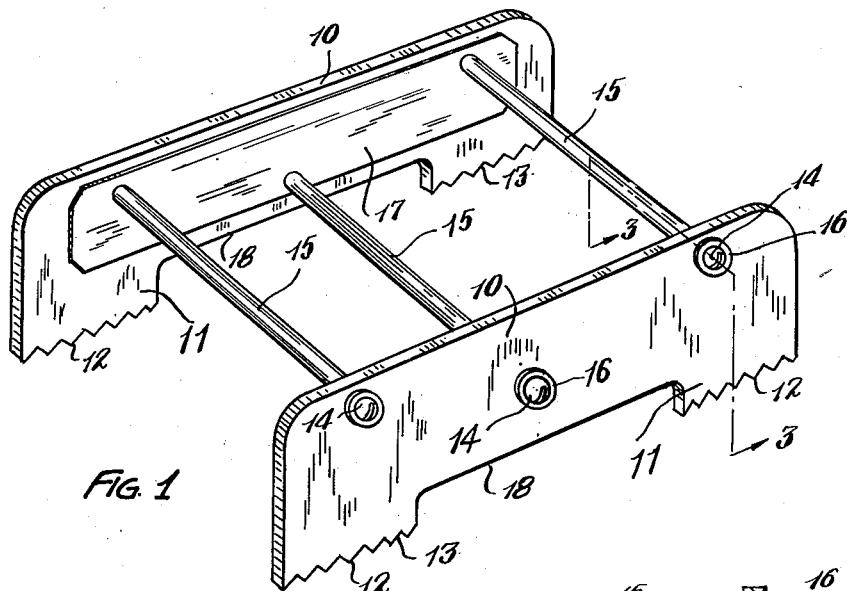
Figure 3:
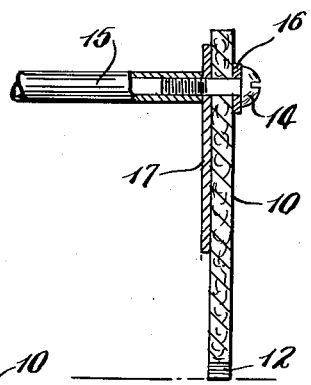
Figure 2:
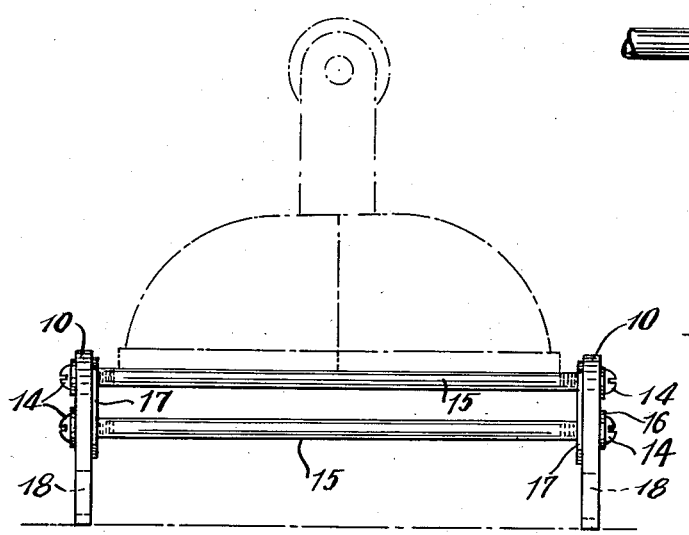

I accomplish the foregoing objects in and through the construction and arrangement of parts shown in the drawings hereof, wherein Fig. 1 represents a perspective view of a support for electrically heated flatirons embodying my invention; Fig. 2 an end elevational view of the support shown in Fig. 1, illustrating in broken lines the manner in which a flatiron is supported thereby; and Fig. 3 a detail in section taken on the line 3—3 of Fig. 1 and looking in the direction of the arrows.

Describing by reference characters the various parts illustrated herein, 10 denotes opposed side members of my support, the same being made of material possessing relatively high resistance to destruction by, and conductivity of, heat. Each of the sides is provided with depending ends or feet 11 provided with alternating projections 12 and recesses 13.

The sides are secured together by means of screws 14 extending through the sides 10 from the exteriors thereof and threaded into connecting and spacing tubes 15, the screws being shown as provided with washers 16 interposed between their heads and the sides 10. The length of the device and the spacing between the end tubes 15 is such as to enable the base of a flatiron to rest upon both end tubes; or the iron may rest upon one end tube and the intermediate tube in an inclined position and be held against endwise movement by engagement with the other end tube.

17 denotes a plate of thin reflecting material, such as aluminum or stainless steel, through which the screws 14 extend and the inner faces of which are engaged by the ends of the tubes 15. These plates serve to protect the sides 10 against radiant heat from a flatiron supported upon the tubes 15, not only by being physically interposed between the sides and the heat rays emanating from the flatiron but also by reflecting these rays away from the sides to which the plates are secured.

The alternating projections 12 and recesses 13 will enable my support to be retained against slipping from the surfaces upon which it may be placed; and where such surface is the cover for an ironing board, the provision for circulation of air longitudinally of the device beneath the tubes 15 and transversely thereof through the recesses 18 provided between the depending feet 11 will protect the support from injury in the event that the iron should be left thereupon for a long time with the heating current turned on.

It will be evident, from the foregoing, that I have produced a device of the character described that is extremely simple in construction, light in weight and economical of production, and which is particularly efficient for the purposes for which it is designed. Furthermore, the parts can be readily disassembled and shipped in compact condition to points of use and thereafter readily assembled.

Having thus described my invention, what I claim is:

1. A device for the purpose specified comprising opposed flat side members of relatively high heat-resisting and non-conducting quality, each of said members being shaped to provide at opposite ends thereof integral feet having means for engaging the surface on which the device may be positioned, and a plurality of slender spacing and supporting members solely connecting the said opposed side members adjacent to the tops thereof and spaced apart longitudinally of said member so as to provide therebetween and therebeneath a space for the free circulation of air.

2. A device for the purpose specified comprising opposed flat side members of relatively high heat-resisting and non-conducting quality, each of said members being shaped to provide at opposite ends thereof integral feet having means for frictionally engaging the surface on which the device may be positioned, a plurality of slender spacing and supporting members solely connecting the said opposed side members adjacent to the tops thereof and spaced apart longitudinally of said member so as to provide therebetween and therebeneath space for the free circulation of air, and a strip or plate of heat reflecting material secured to each side member and extending throughout the major portion of the length thereof.

ARTHUR R. ENGLANDER.

REFERENCES CITED

The following references are of record in the file of this patent:

UNITED STATES PATENTS

| Number | Name | Date |
|---|---|---|
| 1,158,237 | Klenner | Oct. 26, 1915 |
| 1,725,871 | Kuhn et al. | Aug. 27, 1929 |
| 1,799,705 | Rogers | Apr. 7, 1931 |
| 2,422,908 | Kahn | June 24, 1947 |

FOREIGN PATENTS

| Number | Country | Date |
|---|---|---|
| 498,889 | Great Britain | Jan. 16, 1939 |
| 520,218 | Germany | Mar. 9, 1931 |